(12) United States Patent
Lin

(10) Patent No.: US 7,950,752 B2
(45) Date of Patent: May 31, 2011

(54) ELECTRONIC DEVICE AND CASE THEREOF

(75) Inventor: Chien-Chen Lin, Taipei (TW)

(73) Assignee: Asustek Computer Inc., Taipei (TW)

( * ) Notice: Subject to any disclaimer, the term of this patent is extended or adjusted under 35 U.S.C. 154(b) by 767 days.

(21) Appl. No.: 11/750,718

(22) Filed: May 18, 2007

(65) Prior Publication Data

US 2007/0267951 A1    Nov. 22, 2007

(30) Foreign Application Priority Data

May 19, 2006 (TW) .............................. 95117817 A

(51) Int. Cl.
  *A47B 95/00* (2006.01)
(52) U.S. Cl. .................. 312/333; 312/223.2; 312/319.2; 361/679.33
(58) Field of Classification Search ............... 312/223.2, 312/333, 334.47, 319.1, 319.2; 361/679.43, 361/679.58, 679.6, 725–727, 679.33, 679.36
  See application file for complete search history.

(56) References Cited

U.S. PATENT DOCUMENTS

| | | | | |
|---|---|---|---|---|
| 6,299,266 | B1 * | 10/2001 | Justice et al. | 312/223.2 |
| 6,543,866 | B2 * | 4/2003 | Chen et al. | 312/223.2 |
| 6,728,109 | B1 * | 4/2004 | Wu | 361/747 |
| 6,935,604 | B2 * | 8/2005 | Chen | 248/694 |
| 7,259,960 | B2 * | 8/2007 | Hua et al. | 361/679.33 |
| 7,299,933 | B2 * | 11/2007 | Chen et al. | 211/26 |
| 7,384,106 | B2 * | 6/2008 | Lan | 312/223.2 |
| 2003/0076653 | A1 * | 4/2003 | Chan et al. | 361/685 |
| 2006/0002078 | A1 * | 1/2006 | Jing | 361/685 |

* cited by examiner

*Primary Examiner* — Hanh V Tran
(74) *Attorney, Agent, or Firm* — J.C. Patents

(57) ABSTRACT

A case including a holding portion and a rotary part is used to fix a drawer device. A first sidewall of the drawer device has a first hole. The holding portion has a second sidewall and the drawer device is disposed in the holding portion. A second hole is located in the second sidewall. The position of the second hole is corresponding to the first hole. The rotary part is pivoted on an outer side of the holding portion through a first hinge portion and the first hinge portion is located between a first protrusion portion and a second protrusion portion. When the drawer device comes into the holding portion, the drawer device is in contact with the first protrusion portion, which makes the rotary part turn in a first rotating direction and the second protrusion portion pass through the second hole to be fixed in the first hole.

8 Claims, 10 Drawing Sheets

ELECTRONIC DEVICE AND CASE THEREOF

CROSS-REFERENCE TO RELATED APPLICATION

This application claims the priority benefit of Taiwan application serial no. 95117817, filed May 19, 2006. All disclosure of the Taiwan application is incorporated herein by reference.

BACKGROUND OF THE INVENTION

1. Field of Invention

The present invention relates to an electronic device and the case thereof, and more particularly, to a screw-less design of an electronic device and the case thereof.

2. Description of the Related Art

A case is an indispensable apparatus in an electronic device. The major functions of the case are to hold, fix and protect various electronic parts or modules assembled therein. For example, the case of a main body of a desktop computer is to hold, fix and protect various electronic parts or modules therein, such as the motherboard, the floppy disk drive, the hard disk drive and the optical disk drive.

A conventional case is usually designed to include various holding portions with different sizes. The number of holding portions in a case is varied, and different holding portions are designed to assemble various electronic parts or modules, which have different profiles to match the corresponding holding portions. When assembling, a user usually places various electronic parts or modules in different holding portions corresponding to the profiles thereof, followed by using screws to tight the various electronic parts or modules in the corresponding holding portions. Similarly, for maintenance and disassembly, a user needs to loose the screws to free the fastening between the electronic parts or modules and the holding portions, followed by taking away the electronic parts or modules from the holding portions.

However, for an electronic device and the case thereof with the design of screw fasteners, the jobs of assembly and disassembly require hand tools, which increases the inconvenience for a user. In particular, for a removable device that requires frequent assembly and disassembly such as a hard disk drive or an optical disk drive, the inconvenience is more obvious. For a device using screws to fasten, after multiple times of assemblies and disassemblies, the screws may get lost, which further causes the trouble of assembling electronic parts or modules. Furthermore, if a user inadvertently uses a screw with inappropriate screw pitch to fasten the device, the integrity of the thread holes of the electronic parts or modules will be destroyed, which leads to failure to fasten. Besides, repeatedly using a hand tool is also likely to damage the slot/socket of screw head cap, which results in failure to disassemble or assemble.

SUMMARY OF THE INVENTION

An objective of the present invention is to provide a screw-less case to solve the inconvenience of assembling and disassembling a drawer device.

Another objective of the present invention is to provide a screw-less electronic device to solve the inconvenience of assembling and disassembling a drawer device.

To achieve the above-described or other objectives, the present invention provides a case for fixing a drawer device. A first sidewall of the drawer device has a first hole. The case includes a holding portion and a rotary part. The holding portion has at least a second sidewall and the drawer device is disposed at an inner side of the holding portion. A second hole is located in the second sidewall, wherein the position of the second hole is corresponding to the position of the first hole. The rotary part has a first hinge portion, a first protrusion portion and a second protrusion portion. The first hinge portion of the rotary part is pivoted on an outer side of the holding portion and located between the first protrusion portion and the second protrusion portion. When the drawer device comes to a first position of the holding portion, the drawer device is in contact with the first protrusion portion, which forces the rotary part to turn in a first rotating direction and further makes the second protrusion portion pass through the second hole and be fixed in the first hole.

In an embodiment of the present invention, the above-described rotary part further has a third protrusion portion located between the first hinge portion and the second protrusion portion. Once the third protrusion portion holds the second sidewall by pressure, the rotary part produces a second moment to make the second protrusion portion out of the second hole.

In an embodiment of the present invention, when the above-mentioned drawer device comes into the holding portion, the drawer device exerts a force onto the first protrusion portion. At the point, the first protrusion portion receives a first moment that turns in the first rotating direction, and the first moment is larger than the second moment.

In an embodiment of the present invention, the above-mentioned case further includes a fixing part disposed at the outer side of the holding portion. The fixing part has a first latching portion, while the rotary part has a second latching portion. When the second latching portion latches the first latching portion, the second protrusion portion is out of the second hole.

In an embodiment of the present invention, the above-mentioned holding portion further includes a first opening and a second opening. The first protrusion portion is located at the second opening, and the drawer device comes into the holding portion via the first opening.

To achieve the above-described or other objectives, the present invention further provides an electronic device, which includes a drawer device, a holding portion and a rotary part. The drawer device has at least a first sidewall, which has a first hole. The holding portion has at least a second sidewall and the drawer device is disposed at an inner side of the holding portion. A second hole is located in the second sidewall, wherein the position of the second hole is corresponding to the position of the first hole. The rotary part has a first hinge portion, a first protrusion portion and a second protrusion portion. The first hinge portion of the rotary part is pivoted on an outer side of the holding portion and located between the first protrusion portion and the second protrusion portion. When the drawer device comes to a first position of the holding portion, the drawer device is in contact with the first protrusion portion, which forces the rotary part to turn in a first rotating direction and further makes the second protrusion portion pass through the second hole and be fixed in the first hole.

In an embodiment of the present invention, the above-described rotary part further has a third protrusion portion located between the first hinge portion and the second protrusion portion. Once the third protrusion portion holds the second sidewall by pressure, the rotary part produces a second moment to make the second protrusion portion out of the second hole.

In an embodiment of the present invention, when the above-mentioned drawer device comes into the holding portion, the drawer device exerts a force onto the first protrusion portion. At the point, the first protrusion portion receives a first moment that turns in the first rotating direction, and the first moment is larger than the second moment.

In an embodiment of the present invention, the above-mentioned case further includes a fixing part disposed at the outer side of the holding portion. The fixing part has a first latching portion, while the rotary part has a second latching portion. When the second latching portion latches the first latching portion, the second protrusion portion is out of the second hole.

In an embodiment of the present invention, the above-mentioned holding portion further includes a first opening and a second opening. The first protrusion portion is located at the second opening, and the drawer device comes into the holding portion via the first opening.

Since the present invention adopts the screw-less design for a case or an electronic device, a user does not need a hand tool to assemble or disassemble a drawer device. Therefore, the usage convenience is significantly advanced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

Figure 1:
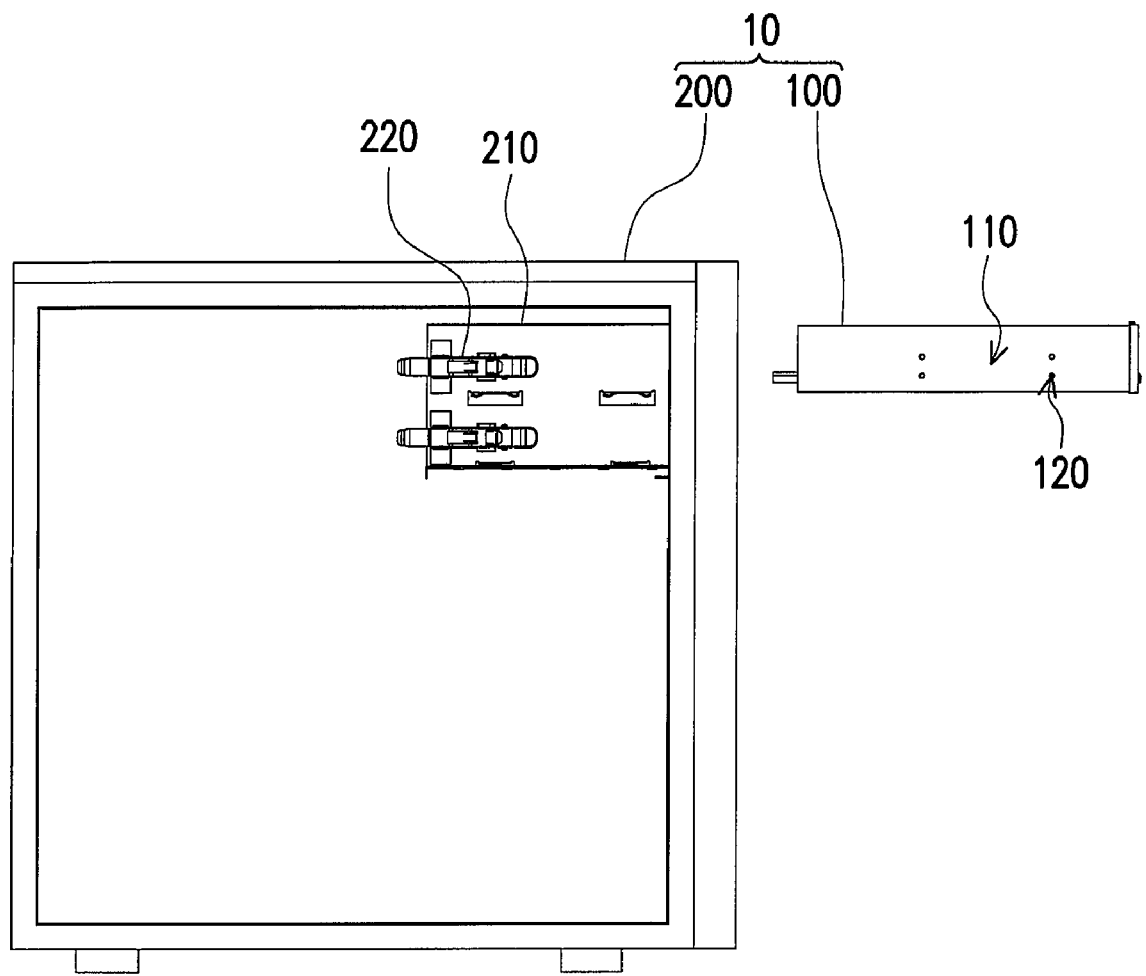
FIG. 1 is a side view of a case and a drawer device prior to assembly according to an embodiment of the present invention.

FIG. 1 is a side view of a case and a drawer device prior to assembly according to an embodiment of the present invention. Referring to FIG. 1, an electronic device 10 includes a drawer device 100 and a case 200. The drawer device 100 has at least a first sidewall 110 and at least a first hole 120, and the first hole 120 is located in the first sidewall 110. The first hole 120 is, for example, the thread hole of a conventional drawer device or other hole. The case 200 includes a holding portion 210 and a rotary part 220. The case 200 can be, for example, the case of a main body of a desktop computer or the case of other devices having a drawer device.

Figure 2A:
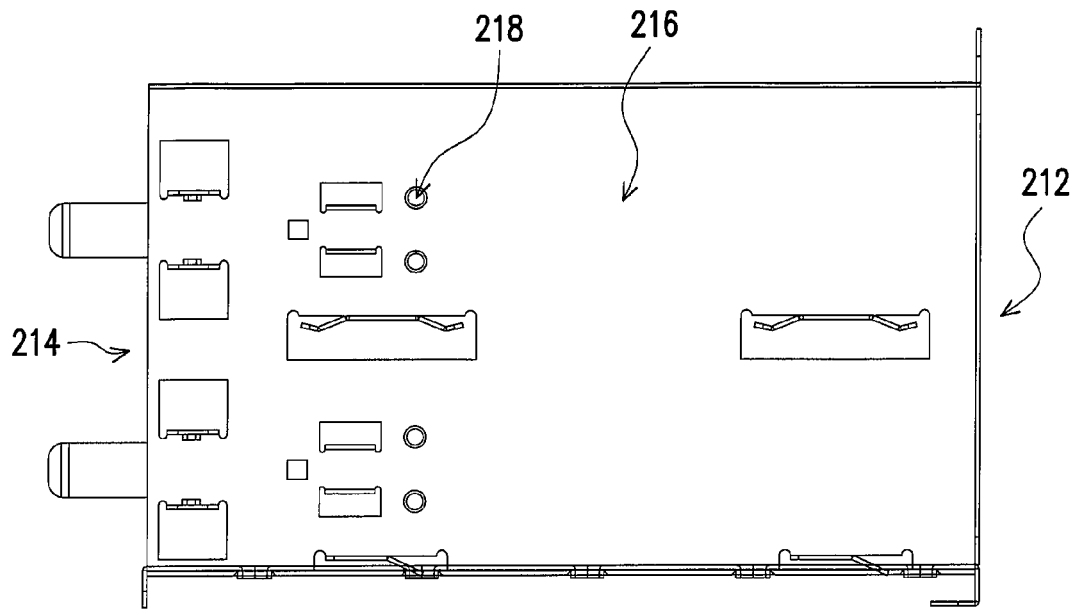
FIG. 2A is a side view of a holding portion according to an embodiment of the present invention.
Figure 2B:
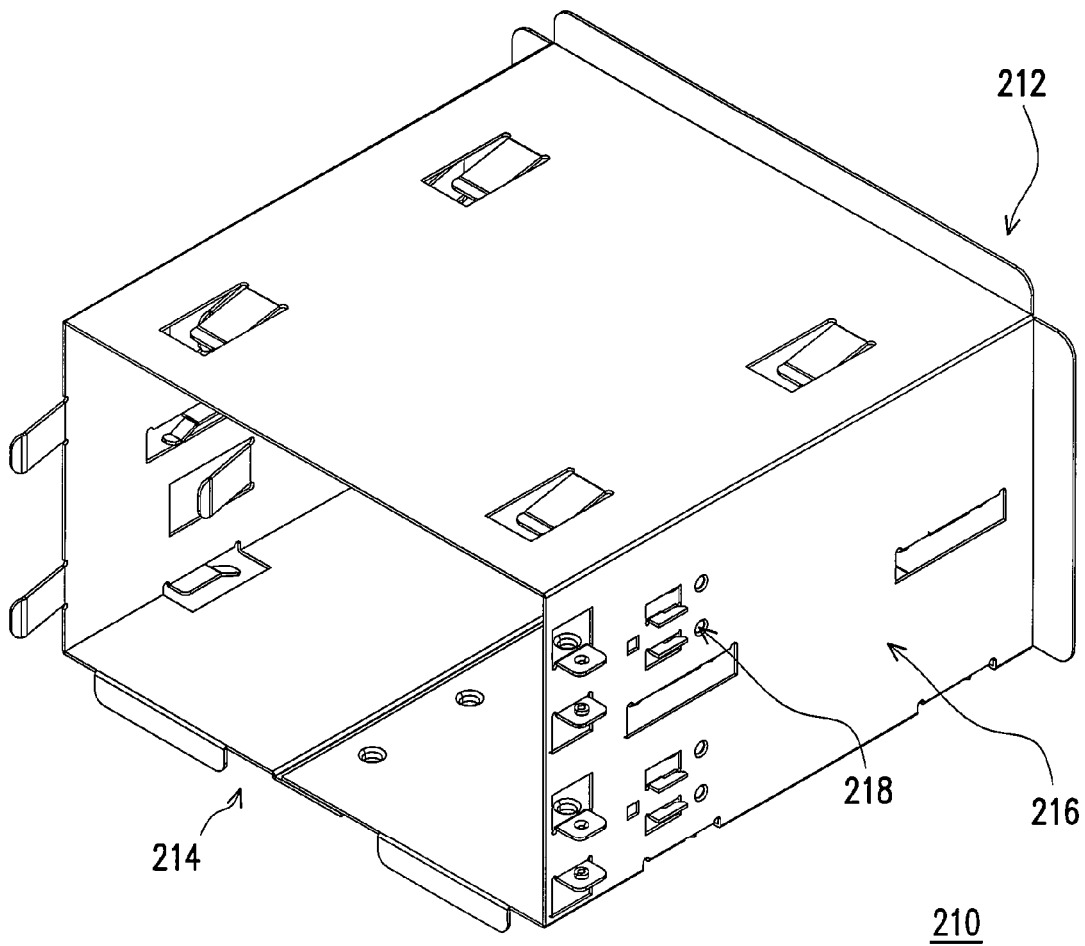
FIG. 2B is the cubic drawing of the holding portion in FIG. 2A.

FIG. 2A is a side view of a holding portion according to an embodiment of the present invention and FIG. 2B is the cubic drawing of the holding portion in FIG. 2A. Referring to FIGS. 1, 2A and 2B, the holding portion 210 has at least a second sidewall 216 and at least a second hole 218. In addition, the holding portion 210 can further have a first opening 212 and a second opening 214, the first opening 212 and the second opening 214 are located at both sides of the holding portion 210 opposite to each other, and at least a second sidewall 216 is located between the first opening 212 and the second opening 214. The second hole 218 is disposed in the second sidewall 216. Wherein, the position of the second hole 218 of the holding portion 210 is corresponding to the position of the first hole 120 of the drawer device 100. Similarly, the second hole 218 is, for example, a thread hole of a conventional holding portion or other holes.

Figure 3A:
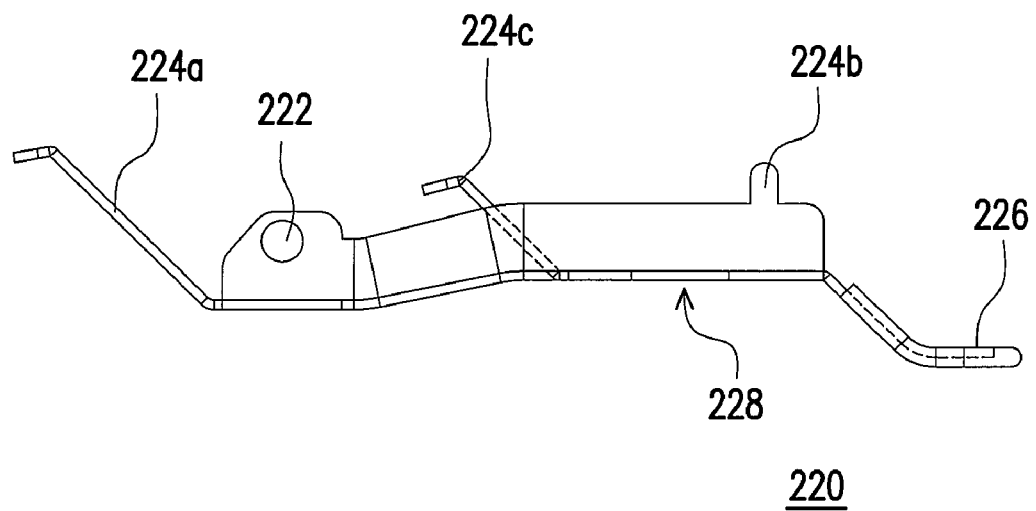
FIG. 3A is a side view of a rotary part according to an embodiment of the present invention.
Figure 3B:
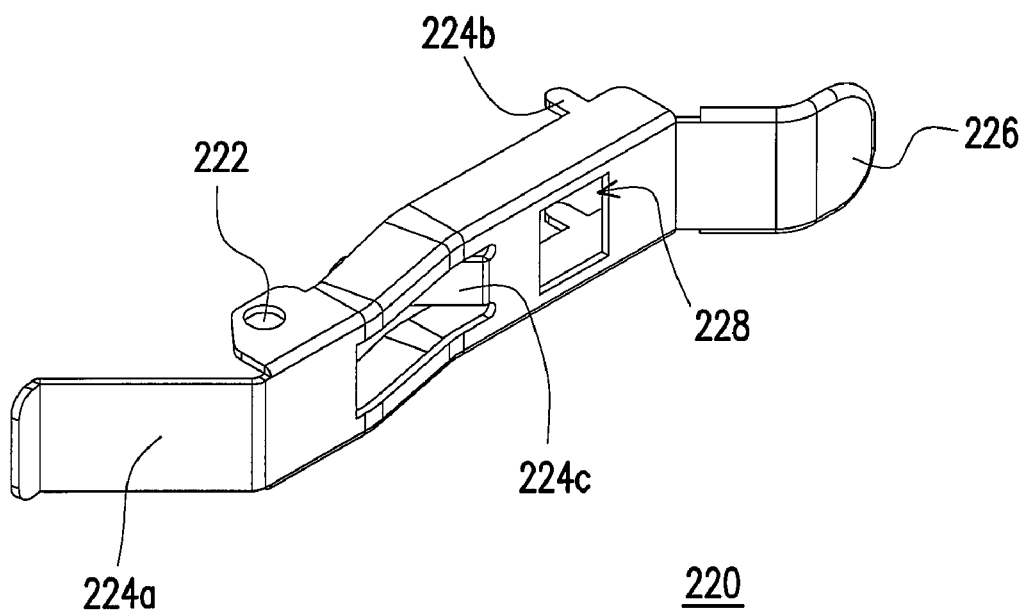
FIG. 3B is a side view of the rotary part in FIG. 3A.
Figure 3C:
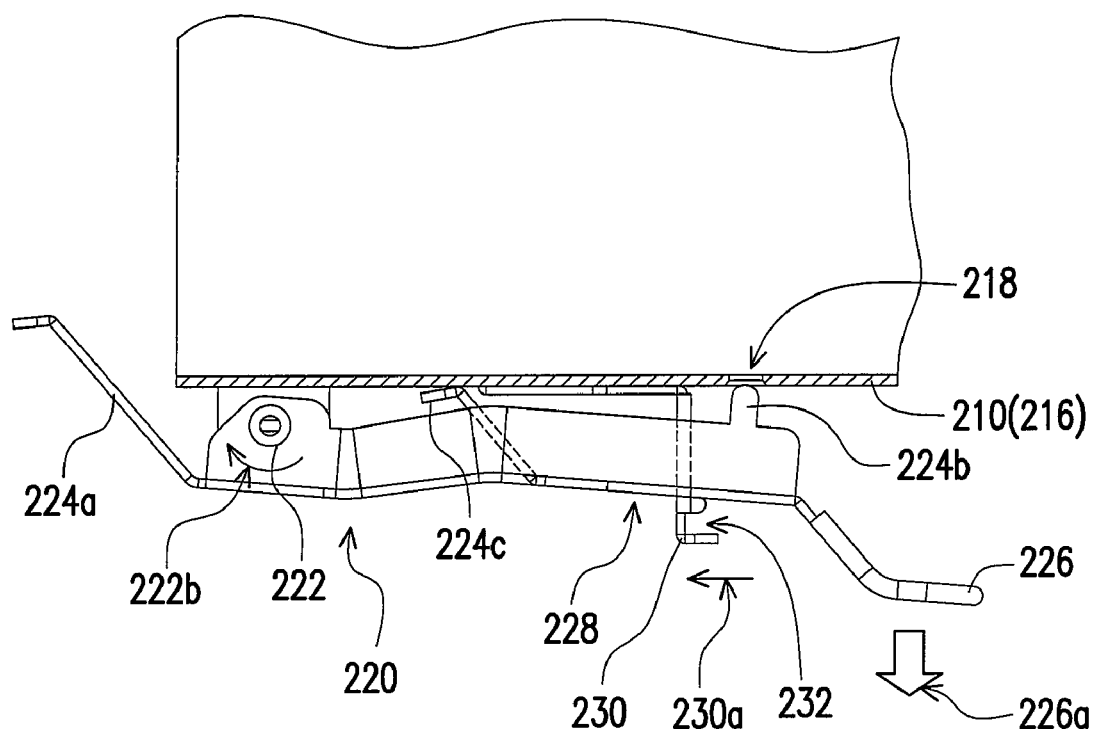
FIG. 3C is an assembly diagram of a rotary part and a holding portion.

FIG. 3A is a side view of a rotary part according to an embodiment of the present invention, FIG. 3B is a side view of the rotary part in FIG. 3A and FIG. 3C is an assembly diagram of a rotary part and a holding portion. Referring to FIGS. 3A, 3B and 3C, the rotary part 220 has a first hinge portion 222, a first protrusion portion 224a and a second protrusion portion 224b. The first hinge portion 222 of the rotary part 220 is pivoted on the outer side of the second sidewall 216 of the holding portion 210 and the first hinge portion 222 is located between the first protrusion portion 224a and the second protrusion portion 224b. The first protrusion portion 224a is an elastic element, which would get elastic deformation if a force is exerted thereto.

Figure 4A:
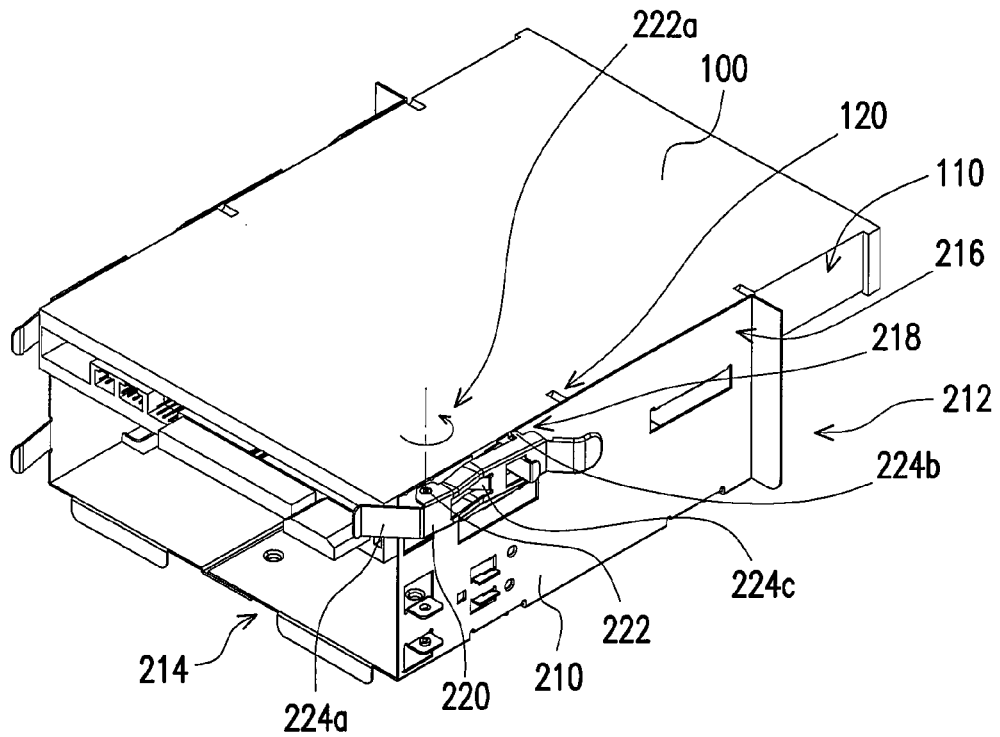
FIG. 4A and FIG. 4B are two schematic cubic drawings showing an assembly process of a holding portion and a drawer device according to an embodiment of the present invention.
Figure 4B:
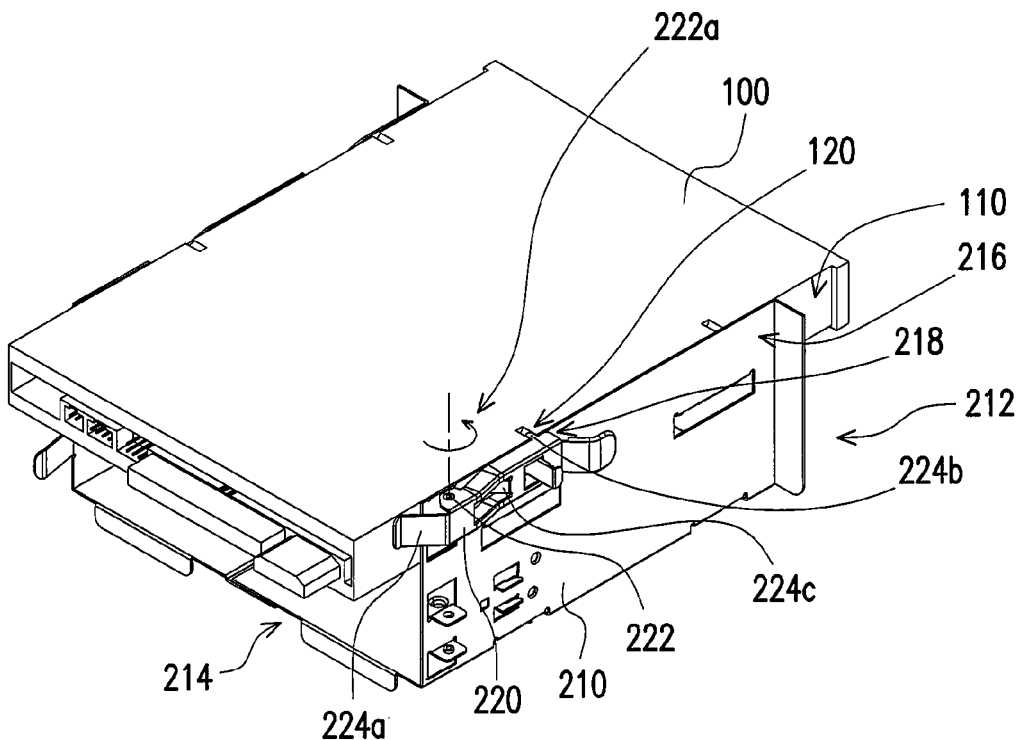

FIG. 4A and FIG. 4B are two schematic cubic drawings showing an assembly process of a holding portion and a drawer device according to an embodiment of the present invention. Referring to FIG. 4A first, the drawer device 100 is placed inside the holding portion 210 through the first opening 212, followed by pushing the drawer device 100 inward to make the drawer device 100 come out from the second opening 214. When the drawer device 100 touches the first protrusion portion 224a of the rotary part 220 and the drawer device 100 keeps being pushed inward, the rotary part 220 would turn in a first rotating direction 222a around the first hinge portion 222 until the second protrusion portion 224b is plugged into the second hole 218 of the holding portion 210, and the second protrusion portion 224b is in contact with the first sidewall 110 of the drawer device 100. Since the second protrusion portion 224b has been in touch with the first sidewall 110 of the drawer device 100 already, the rotary part 220 is not able to keep turning around. Meanwhile, by means of elastic deformation, the first protrusion portion 224a would produce a first moment (not shown). The drawer device 100 keeps being pushed inward until the second hole 218 of the holding portion 210 aligns with the first hole 120 of the drawer device 100, the first moment enables the second protrusion portion 224b of the rotary part 220 to be plugged in the first hole 120 of the drawer device 100. Thus, the drawer device 100 is fixed in the holding portion 210.

Further, referring to FIG. 4B, when the drawer device 100 keeps going into the holding portion 210 until it arrives at a first position shown by FIG. 4B, the second protrusion portion 224b would align with the first hole 120 of the drawer device 100. At the point, the first moment caused by the elastic deformation of the first protrusion portion 224a makes the rotary part 220 turn in the first rotating direction 222a around the first hinge portion 222 until the second protrusion portion 224b is plugged in the first hole 120 of the drawer device. At the point, the drawer device 100 is fixed in the holding portion 210, so as to complete assembling the drawer device 100. Since a user needs no hand tool and screw fasteners, such an assembly process of the drawer device 100 is very convenient.

Referring to FIGS. 3A, 3B and 3C again, the rotary part 220 can have a third protrusion portion 224c, which is located between the first hinge portion 222 and the second protrusion portion 224b and is an elastic element to make elastic deformation after receiving a force. Without installing the drawer device 100, the second protrusion portion 224b is kept out of the second hole 218 of the holding portion 210 by means of the elastic deformation of the third protrusion portion 224c. In more detail, before the first protrusion portion 224a touches the drawer device 100, the third protrusion portion 224c holds the second sidewall 216 of the holding portion 210 by pressure (referring to FIGS. 2A and 2B) and gets an elastic deformation, which further produces a second moment (not shown). The second moment makes the rotary part 220 turn in the second rotating direction 222b around the first hinge portion 222, which forces the second protrusion portion 224b to out of the second hole 218. Thus, by means of the design of the third protrusion portion 224c, it can avoid the second protrusion portion 224b from accidentally being plugged into the second hole 218 of the holding portion 210 prior to installing the drawer device 100, which certainly disturbs installing the drawer device 100. Note that, referring to FIG. 4B, during the drawer device 100 is being pushed into the holding portion 210, the first moment produced by an elastic deformation of the first protrusion portion 224a should be larger than the second moment produced by an elastic deformation of the third protrusion portion 224c. In this way, once the second protrusion portion 224b aligns with the first hole 120 of the drawer device 100, the second protrusion portion 224b can be freely plugged into the first hole 120.

Figure 4C:
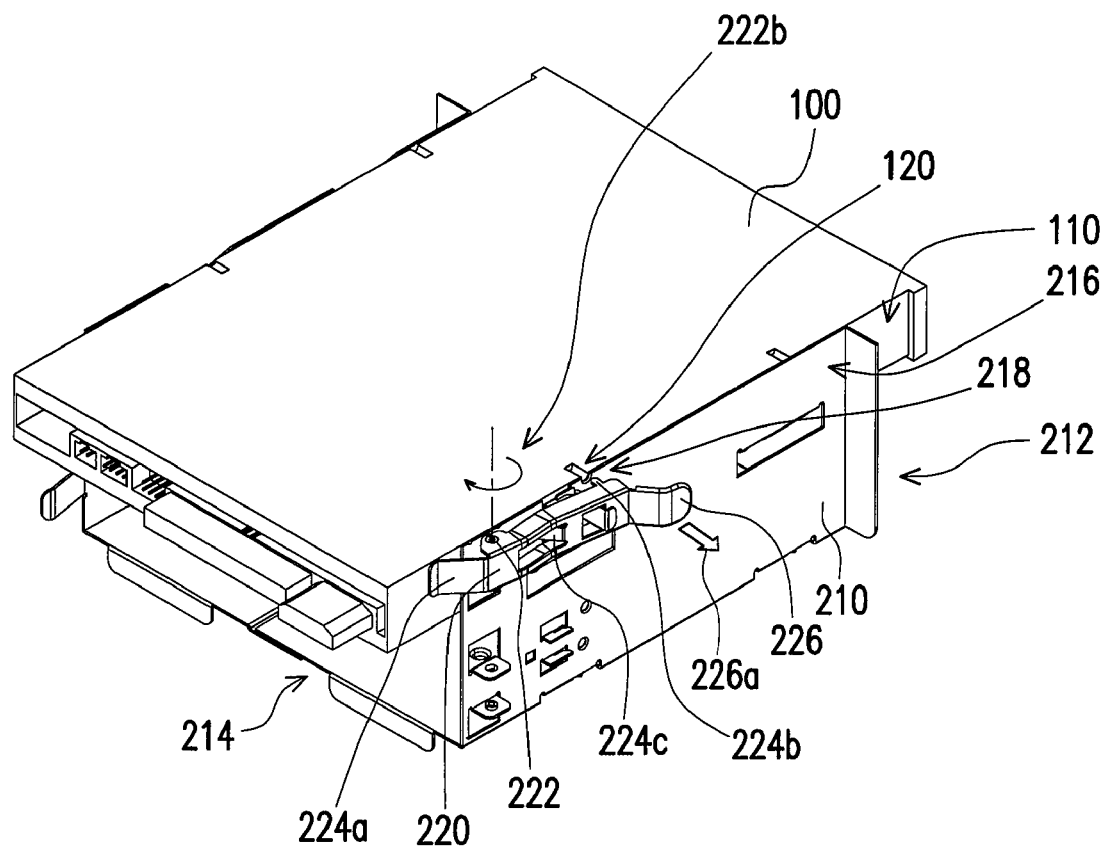
FIG. 4C is a diagram showing how to free the fixing between a rotary part and a drawer device according to an embodiment of the present invention.

FIG. 4C is a diagram showing how to free the fixing between a rotary part and a drawer device according to an embodiment of the present invention. Referring to FIGS. 3A, 3B and 3C first, the rotary part can further have a handle. Referring to FIG. 4C, to pull the drawer device 100 out of the holding portion 210, a user can exert a force (not shown) on the handle 226 along the direction of an arrow 226a, which would produce a third moment (not shown). When the third moment exerted by the user on the handle 226 is larger than the first moment produced by the elastic deformation of the first protrusion portion 224a, the rotary part turns in the second rotating direction 222b around the first hinge portion 222. Meanwhile, the second protrusion portion 224b is pulled out from the first hole 120 of the drawer device, so as to free the fixing between the rotary part 220 and the drawer device 100. Then, the drawer device 100 is able to be taken out from the first opening 212 of the holding portion 210. Since only exerting a force is required to disassemble the drawer device 100 and no hand tool is needed for assistance, the disassembly process is very convenient.

Figure 5A:
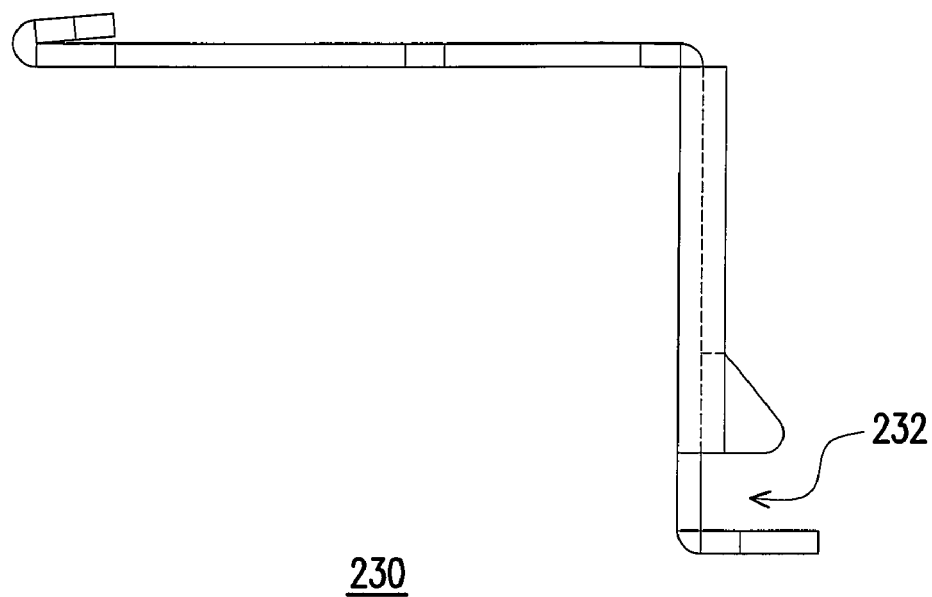
FIG. 5A is a side view of a fixing part according to an embodiment of the present invention.
Figure 5B:
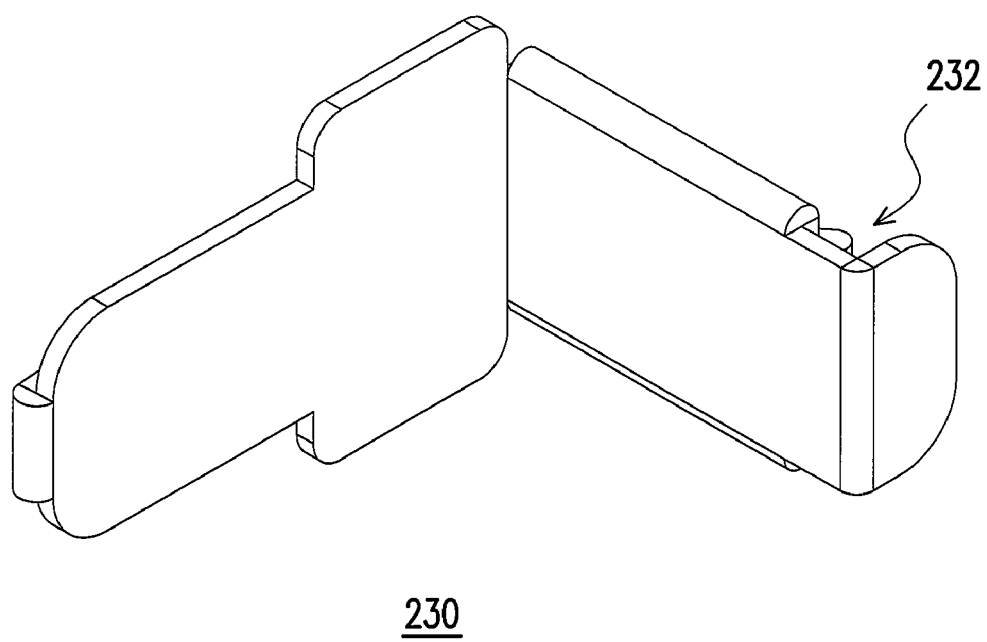
FIG. 5B is the cubic drawing of the fixing part in FIG. 5A.

Note that, referring to FIG. 3C, the case 200 can further include a fixing part 230 disposed at the outer side of the holding portion 210. FIG. 5A is a side view of a fixing part according to an embodiment of the present invention and FIG. 5B is the cubic drawing of the fixing part in FIG. 5A. Referring to FIGS. 5A and 5B, the fixing part 230 has a first latching portion 232; referring to FIGS. 3A, 3B and 3C, the rotary part 220 has a second latching portion 228. In the present embodiment, the second latching portion 228 can be, for example, a rectangular opening. Referring to FIG. 3C again, to pull the drawer device (not shown) out of the holding portion 210, a user can exert a force on the handle 226 along the direction of the arrow 226a to turn the rotary part 220 in the second rotating direction 222b around the first hinge portion 222 until the second latching portion 228 latches the first latching portion 232. At the point, referring to FIG. 4C, the second protrusion portion 224b is kept out of the second hole 218 of the holding portion 210; thus the drawer device 100 is able to be taken out from the first opening 212 of the holding portion 210. Continuing to FIG. 3C, the user further exerts a force on the fixing part 230 along the direction of the arrow 230a (not shown) to free the fixing between the first latching portion 232 and the second latching portion 228, and the drawer device is ready for the next assembling. In short, to disassemble the drawer device it needs to fix the rotary part 220 by latching the first latching portion 232 with the second latching portion 228, followed by pulling out the drawer device. Such a scheme allows a user to manipulate by one hand for disassembling the drawer device, which further advances the convenience of the present invention.

Figure 6A:
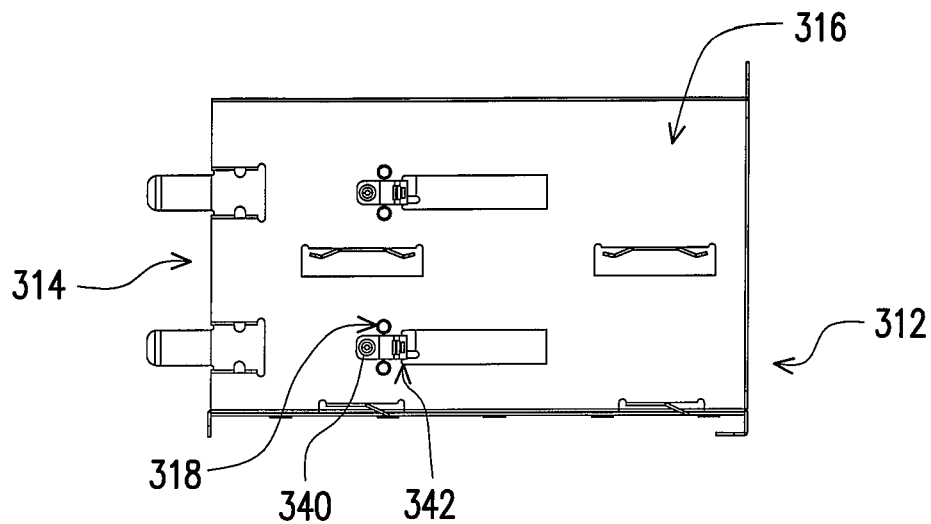
FIG. 6A is a side view of a holding portion according to another embodiment of the present invention.
Figure 6B:
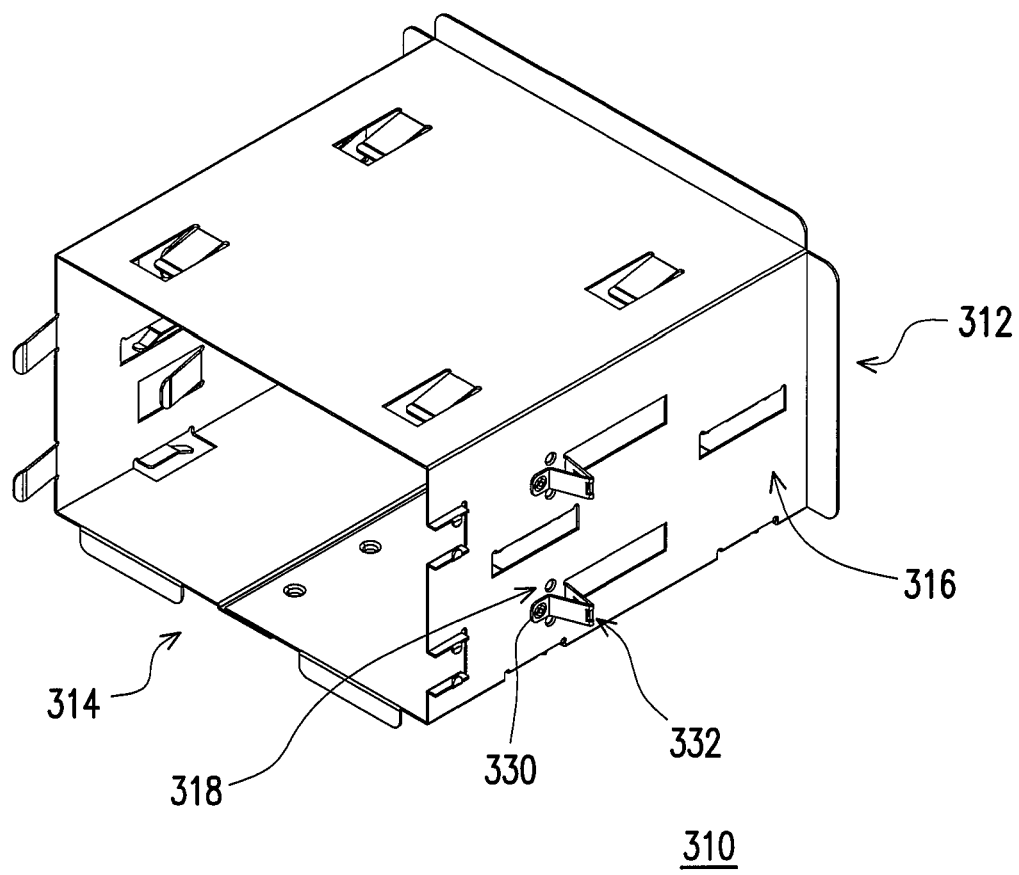
FIG. 6B is the cubic drawing of the holding portion in FIG. 6A.
Figure 7A:
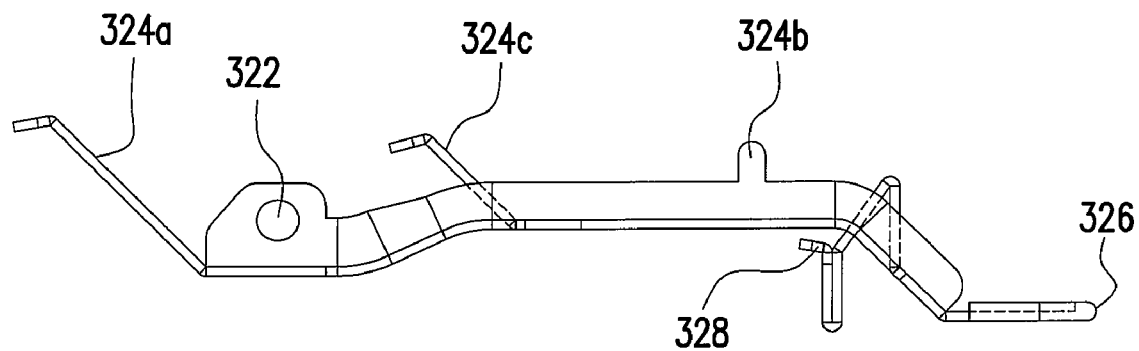
FIG. 7A is a side view of a rotary part according to another embodiment of the present invention.
Figure 7B:
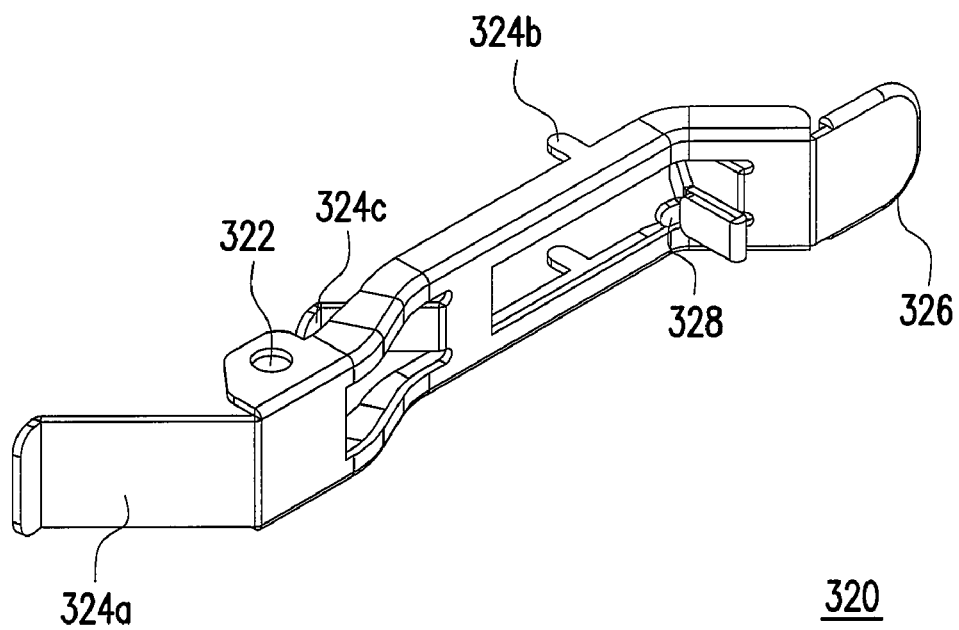
FIG. 7B is the cubic drawing of the rotary part in FIG. 7A.
Figure 7C:
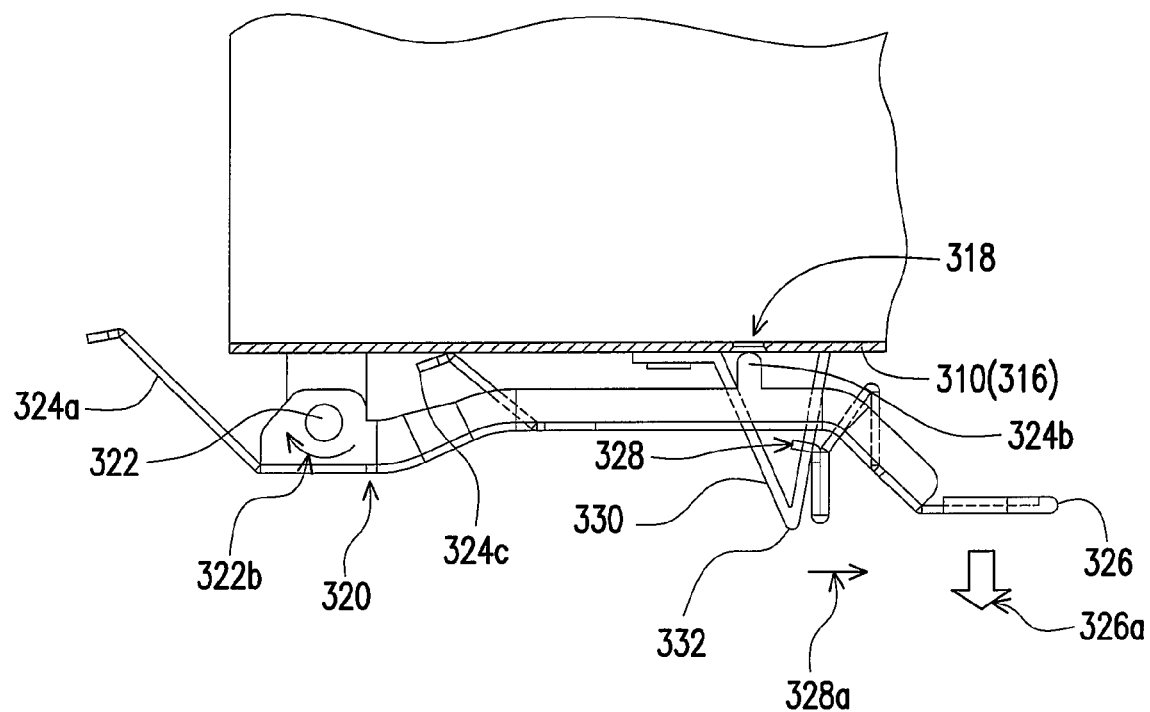
FIG. 7C is an assembly diagram of a rotary part and a holding portion according to another embodiment of the present invention.

FIG. 6A is a side view of a holding portion according to another embodiment of the present invention and FIG. 6B is the cubic drawing of the holding portion in FIG. 6A. FIG. 7A is a side view of a rotary part according to another embodiment of the present invention, FIG. 7B is the cubic drawing of the rotary part in FIG. 7A and FIG. 7C is an assembly diagram of a rotary part and a holding portion according to another embodiment of the present invention. Referring to FIGS. 1, 6A, 6B, 7A, 7B and 7C, the functions and the implement methods of the holding portion 310, the rotary part 320 and the fixing part 330 of the present embodiment are respectively similar to the holding portion 210, the rotary part 220 and the fixing part 230 of the previous embodiment. To install the drawer device 100 in the holding portion 310, a user is required to use the drawer device 100 to push the first protrusion portion 324a, so as to turn the rotary part 320. Afterwards, the second protrusion portion 324b is used to be plugged into the first hole 120 of the drawer device 100 to fix the drawer device 100 in the holding portion 310. To disassemble the drawer device 100, in the same way, a force is exerted on the handle 326 of the rotary part 320 along the direction of the arrow 326a (not shown) for producing a third moment (not shown). Thus, the second protrusion portion 324b is pulled out from the first hole 120 of the drawer device 100. Finally, the drawer device 100 is taken out from the first opening 312 of the holding portion 310.

Similarly, referring to FIG. 7C, to pull the drawer device (not shown) out of the holding portion 310, a user needs to exert a force along the direction of the arrow 326a to turn the rotary part 320 in the second rotating direction 322b around the first hinge portion 322 until the second latching portion 328 latches the first latching portion 332. At the point, the second protrusion portion 324b is kept out of the second hole 318 of the holding portion 310; thus the drawer device is able to be pulled out from the first opening 312 of the holding portion 310. Further, the user further exerts a force on the second latching portion 328 along the direction of the arrow 328a (not shown) to free the fixing between the first latching portion 332 and the second latching portion 328, so as to facilitate the next assembly of the drawer device.

In summary, the present invention adopts the scheme of screw-less design, wherein a rotary part is used to replace the conventional screws for fixing the drawer device. Therefore, a user does not need a hand tool to assemble or disassemble a drawer device. Furthermore, the user is allowed to manipulate by one hand for assembling and disassembling the drawer device. In addition, the scheme of screw-less design is able to avoid the problem resulted from using screws to fasten devices in the prior art that the screws are likely to be damaged or lost, which further advances the convenience of assembling and disassembling the drawer device.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. A case used for fixing a drawer device, wherein a first sidewall of the drawer device has a first hole, the case comprising:

a holding portion, which has at least one second sidewall and at least one second hole located in the second sidewall and corresponding to the first hole, and the holding portion is for holding the drawer device; and a rotary part, which has a first hinge portion, a first protrusion portion and a second protrusion portion, wherein the rotary part is pivoted on an outer side of the holding portion through the first hinge portion, the first hinge portion is located between the first protrusion portion and the second protrusion portion, when the drawer device enters the holding portion, the drawer device pushes the first protrusion portion to make the second protrusion portion passes through the second hole and insert in the first hole.

2. The case as recited in claim 1, wherein the rotary part further has a third protrusion portion located between the first hinge portion and the second protrusion portion, the third protrusion portion pressing against the second sidewall and provides resilient force to make second protrusion portion detached from the second hole.

3. The case as recited in claim 1, further comprising a fixing part disposed on the outer side of the holding portion, wherein the fixing part has a first latching portion, the rotary part further has a second latching portion, when the second latching portion latches the first latching portion, the second protrusion portion is out of the second hole.

4. The case as recited in claim 1, wherein the holding portion further comprises a first opening and a second opening, the first protrusion portion locates at the second opening, and the drawer device comes into the holding portion via the first opening.

5. An electronic device, comprising:

a drawer device, wherein at least one first sidewall of the drawer device has a first hole;

a holding portion, which has at least one second sidewall and at least one second hole located in the second sidewall and corresponding to the first hole, and the holding portion is for holding the drawer device; and a rotary part, which has a first hinge portion, a first protrusion portion and a second protrusion portion, wherein the rotary part is pivoted on an outer side of the holding portion through the first hinge portion, the first hinge portion is located between the first protrusion portion and the second protrusion portion, when the drawer device enters the holding portion, the drawer device pushes the first protrusion portion to make the rotary part turn in a first rotating direction and the second protrusion portion passes through the second hole and insert in the first hole.

6. The electronic device as recited in claim 5, wherein the rotary part further has a third protrusion portion located between the first hinge portion and the second protrusion portion, the third protrusion portion pressing against the second sidewall and provides a resilient force to make the second protrusion portion detached form the second hole.

7. The electronic device as recited in claim 5, wherein the case further comprises a fixing part disposed on the outer side of the holding portion, the fixing part has a first latching portion, the rotary part further has a second latching portion, when the second latching portion latches the first latching portion, the second protrusion portion is out of the second hole.

8. The electronic device as recited in claim 5, wherein the holding portion further comprises a first opening and a second opening, the first protrusion portion locates at the second opening, and the drawer device comes into the holding portion via the first opening.

* * * * *